United States Patent
Harding et al.

(10) Patent No.: US 8,924,931 B2
(45) Date of Patent: Dec. 30, 2014

(54) METHOD AND SYSTEM FOR DETERMINING DEPENDENCIES IN A MAINFRAME DEVELOPMENT ENVIRONMENT

(75) Inventors: Jeremy Harding, St. Albans (GB); Stuart Mitchell, Newbury (GB); Michael Troth, Secor, IL (US); Peter Raymond, St. Albans (GB)

(73) Assignee: Serena Software, Inc., San Mateo, CA (US)

( * ) Notice: Subject to any disclaimer, the term of this patent is extended or adjusted under 35 U.S.C. 154(b) by 1913 days.

(21) Appl. No.: 11/848,161

(22) Filed: Aug. 30, 2007

(65) Prior Publication Data

US 2008/0059946 A1 Mar. 6, 2008

Related U.S. Application Data

(60) Provisional application No. 60/842,057, filed on Aug. 31, 2006.

(51) Int. Cl.
*G06F 9/44* (2006.01)
*G06F 9/45* (2006.01)

(52) U.S. Cl.
CPC ....................... *G06F 8/71* (2013.01)
USPC ............................ 717/121; 717/127; 717/140

(58) Field of Classification Search
CPC .......... G06F 8/41; G06F 8/71; G06F 11/3466
See application file for complete search history.

(56) References Cited

U.S. PATENT DOCUMENTS

| | | | | |
|---|---|---|---|---|
| 5,355,484 A | * | 10/1994 | Record et al. | 717/127 |
| 5,548,506 A | * | 8/1996 | Srinivasan | 705/7.15 |
| 5,715,458 A | * | 2/1998 | Holder et al. | 719/319 |
| 5,850,554 A | * | 12/1998 | Carver | 717/162 |
| 5,896,538 A | * | 4/1999 | Blandy et al. | 717/127 |
| 6,178,546 B1 | * | 1/2001 | McIntyre | 717/115 |
| 6,453,277 B1 | * | 9/2002 | Helsley et al. | 703/24 |
| 6,487,713 B1 | * | 11/2002 | Cohen et al. | 717/105 |
| RE38,633 E | * | 10/2004 | Srinivasan | 709/226 |
| 7,003,759 B2 | * | 2/2006 | Jameson | 717/120 |
| 7,356,679 B1 | * | 4/2008 | Le et al. | 713/1 |

(Continued)

OTHER PUBLICATIONS

Posner et al., CASEVision/ClearCase Concepts Guide, published before 2005, Document No. 007-1612-020, pp. 1-40.*

(Continued)

*Primary Examiner* — Tuan Q. Dam
*Assistant Examiner* — Zheng Wei
(74) *Attorney, Agent, or Firm* — Hickman Palermo Truong Becker Bingham Wong LLP

(57) ABSTRACT

Techniques are provided for determining dependencies in a mainframe development environment. While executing a first build file to generate a first build of a software program from files in a file system, the activity in the file system is monitored to determine a plurality of files that are being accessed, and first information about the plurality of files is recorded. The first information is sent to a configuration management server. From the configuration management server, second information is received that indicates one or more dependencies which are determined among the plurality of files based on the first information. Based at least on the second information, a second build file is generated. The second build file is executed to generate a second build of the software program, where the second build is generated more efficiently by using less computing resources than the first build of the software program.

25 Claims, 4 Drawing Sheets

(56) References Cited

U.S. PATENT DOCUMENTS

| | | | |
|---|---|---|---|
| 7,418,376 B1* | 8/2008 | Feldstein et al. | 703/21 |
| 7,437,712 B1* | 10/2008 | Brown et al. | 717/122 |
| 7,519,953 B2* | 4/2009 | Reissman et al. | 717/124 |
| 7,640,533 B1* | 12/2009 | Lottero et al. | 717/108 |
| 7,676,788 B1* | 3/2010 | Ousterhout et al. | 717/106 |
| 7,721,272 B2* | 5/2010 | Mockford | 717/140 |
| 7,761,851 B2* | 7/2010 | Bailey et al. | 717/121 |
| 7,774,754 B2* | 8/2010 | Komissarchik et al. | 717/120 |
| 8,051,405 B2* | 11/2011 | Komissarchik et al. | 717/115 |
| 8,266,588 B2* | 9/2012 | Abdelhadi et al. | 717/120 |
| 2002/0199170 A1* | 12/2002 | Jameson | 717/120 |
| 2004/0010598 A1* | 1/2004 | Bales et al. | 709/228 |
| 2004/0068554 A1* | 4/2004 | Bales et al. | 709/218 |
| 2005/0071818 A1* | 3/2005 | Reissman et al. | 717/127 |
| 2005/0114847 A1* | 5/2005 | Whalley | 717/140 |
| 2005/0268283 A1* | 12/2005 | Clemm et al. | 717/121 |
| 2006/0095312 A1* | 5/2006 | Conti et al. | 705/10 |
| 2006/0136881 A1* | 6/2006 | Nesbitt et al. | 717/140 |
| 2007/0006122 A1* | 1/2007 | Bailey et al. | 717/101 |
| 2007/0174814 A1* | 7/2007 | Komissarchik et al. | 717/115 |
| 2007/0203877 A1* | 8/2007 | Qu et al. | 707/1 |
| 2007/0226731 A1* | 9/2007 | Tseitlin et al. | 717/171 |
| 2007/0250574 A1* | 10/2007 | Tseitlin et al. | 709/205 |
| 2007/0250575 A1* | 10/2007 | Tseitlin et al. | 709/205 |
| 2013/0198717 A1* | 8/2013 | Igelka | 717/121 |

OTHER PUBLICATIONS

IBM, File No. S360-36 GY27-7236-1, Program Logic OS Release 21, IBM System/360 Operating System MFT Supervisor, published by IBM, Second Edition Mar. 1972, pp. 1-514.*

IBM Enterprise System Architecture/390 Principles of Operation, published by IBM, Eighth Edition (Jul. 2001), pp. 1-982.*

* cited by examiner

```
<BuildSummary>
    <StartTime>20060826091938.049387</StartTime>
    <OperatingSystem>z/OS</OperatingSystem>
    <TargetItem>
        <Name>//MTROTH.TEST.BLD1.DEV.OBJ(MDOARBLD)</Name>
        <MetaData>mtime=1156583996</MetaData>
        <ReturnCode>0</ReturnCode>
        <Target>
            <Name>//MTROTH.TEST.BLD1.DEV.LNKLIB(MDOARBLD)</Name>
            <MetaData>mtime=1156583996</MetaData>
        </Target>
        <Listing>
            <Name>//MTROTH.TEST.BLD1.DEV.ASMLIST(MDOARBLD)</Name>
            <Type>Assembly_Listing</Type>
            <MetaData>mtime=1156583996</MetaData>
        </Listing>
        <Listing>
            <Name>//MTROTH.TEST.BLD1.DEV.LNK1LIST(MDOARBLD)</Name>
            <Type>Link_Listing</Type>
            <MetaData>mtime=1156583996</MetaData>
        </Listing>
        <SourceItem>
            <Name>//MTROTH.TEST.BLD1.DEV.ASM(MDOARBLD)</Name>
            <MetaData>item-uid=4206370,item-spec=4255494C443A4133352E412D535,
                      file-version=1,checksum=ce4673c8fd1f3a633ffac2f85c3468a4,
                      fetch-size=215760,mtime=1156465012</MetaData>
        </SourceItem>
        <SourceItem>
            <Name>//SYS1.MACLIB(WTO)</Name>
            <MetaData></MetaData>
        </SourceItem>
        <SourceItem>
            <Name>//SYS1.MACLIB(SYSSTATE)</Name>
            <MetaData></MetaData>
        </SourceItem>
        <SourceItem>
            <Name>//SYS1.MACLIB(ABEND)</Name>
            <MetaData></MetaData>
        </SourceItem>
        <SourceItem>
            <Name>//SYS1.MACLIB(PUT)</Name>
            <MetaData></MetaData>
        </SourceItem>
    </TargetItem>
</BuildSummary>
```

FIG. 2

METHOD AND SYSTEM FOR DETERMINING DEPENDENCIES IN A MAINFRAME DEVELOPMENT ENVIRONMENT

PRIORITY CLAIM

This application claims priority under 35 U.S.C. §119(e) to U.S. Provisional Patent Application Ser. No. 60/842,057, entitled "METHOD AND SYSTEM FOR DETERMINING DEPENDENCIES IN A MAINFRAME DEVELOPMENT ENVIRONMENT", filed by Jeremy Harding et al. on Aug. 31, 2006, the entire content of which is hereby incorporated by reference for all purposes as if fully set forth herein.

FIELD OF THE INVENTION

This invention relates generally to software development in a mainframe environment.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The ability to communicate with other computer systems was not considered and fully provided for when mainframe computers were initially designed. It is therefore difficult for outside computer systems (such as, for example, client or server systems) to monitor the activity in mainframe computers, even though an outside computer system may benefit from knowing what happens in a mainframe computer in response to tasks submitted to the mainframe computer by the outside computer system.

One example of such outside computer system is a software configuration management server. In general, a server is a combination of integrated software components and an allocation of computational resources (e.g., memory, CPU time, and/or disk storage space) for executing the software components. By utilizing its allocated resources, a configuration management server is operable to control and manage software project development by supporting various development functionalities including, without limitation, versioning of project files, providing components for building executable project files, and controlling access to project files.

Because of the design limitations of mainframe computers, it is difficult for configuration management servers to support a full scale of development functionalities for software programs and projects that are developed on mainframe computers. For example, a configuration management server cannot monitor the activities that occur on a mainframe computer while a build of a software program is being generated at the mainframe computer. As a result, the configuration management server may not be capable of facilitating an efficient execution of builds on the mainframe computer or may even not be able to control the execution of builds on the mainframe computer at all.

BRIEF DESCRIPTION OF THE DRAWINGS

In the figures of the accompanying drawings like reference numerals refer to similar elements.

FIG. 2 is a block diagram that illustrates an example of build information gathered by monitoring the activity in a file system according to one embodiment.

DETAILED DESCRIPTION

Figure 1:
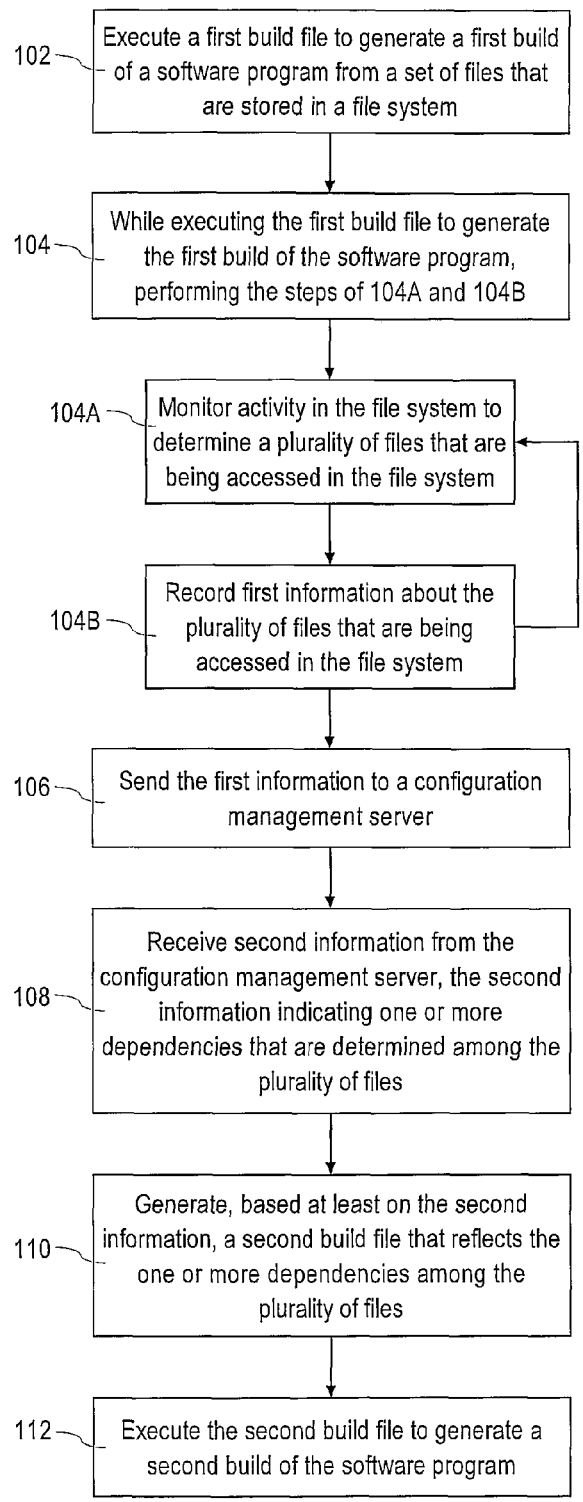
FIG. 1 is a flow diagram that illustrates an overview of an example method for determining dependencies according to one embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. FUNCTIONAL DESCRIPTION OF AN EXAMPLE EMBODIMENT
III. BUILD INFORMATION AND EXAMPLE BILL OF MATERIALS
IV. EXAMPLE OPERATIONAL CONTEXT
V. DEPENDENCY DETERMINATION AND IMPACT ANALYSIS
VI. ADDITIONAL FEATURES AND ALTERNATIVE EMBODIMENTS
VII. IMPLEMENTATION MECHANISMS

I. Overview

Techniques are described herein for determining dependencies in a mainframe development environment. While executing a first build file to generate a first build of a software program from files in a file system, the activity in the file system is monitored to determine a plurality of files that are being accessed, and first information about the plurality of files is recorded. The first information is sent to a configuration management server. From the configuration management server, second information is received that indicates one or more dependencies which are determined among the plurality of files based on the first information. Based at least on the second information, a second build file is generated. The second build file is executed to generate a second build of the software program, where the second build is generated more efficiently by using less computing resources than the first build of the software program.

In an example embodiment, calls to the file system operated by a mainframe computer system are monitored and information relating thereto is recorded while a build of a software program is being generated by the mainframe computer system. The build information collected during the monitoring is sent to a software configuration management server. The configuration management server analyses the collected build information, and automatically determines the dependencies and detects the exact build relationships among files that participate in the build. After determining the build dependencies and relationships, the configuration management server generates dependency information that can be used to generate a modified build script for a subsequent build, where the modified build script takes into account the detected build dependencies and relationships. When the subsequent build needs to be performed to generate a new version of the software program, the configuration management server sends the dependency information to the mainframe computer system, which generates the modified build script.

The modified build script, when executed by the mainframe computer system to generate the new version of the software program, reduces the number of tasks and/or operations that need to be performed and thus reduces the computing resources used and the amount of time spent for generating the build.

It is noted that according to the techniques described herein, the source code in the files participating in the build of a software program is not parsed or otherwise inspected in order to determine the dependencies and relationships among the build files. Further, the techniques described herein do not use dependency information generated by a compiler for a build of a software program. Rather, the techniques described herein determine build dependencies and relationships among build files based on information collected by monitoring the activity in the file system while the build is being generated.

II. Functional Description of an Example Embodiment

FIG. 1 is a flow diagram that illustrates an overview of an example method for determining dependencies between files participating in a build of a software program. In an example embodiment, the method illustrated in FIG. 1 may be performed in a mainframe computer system. As used herein, "mainframe computer system" refers to a system comprising a specific one of MVS, z/OS, and OS390 operating systems (which are provided by IBM Corporation of Armonk, N.Y.) and a hardware platform that-is operable to execute that specific operating system, where the specific operating system is configurable to control access to, and/or to otherwise manage, one or more file systems.

In step 102, a first build file is executed to generate a first build of a software program from a set of files that are stored in a file system. A "build" of a software program refers to a particular executable version of the software program that may comprise an executable file and one or more files of other types such as, for example, object files and dynamically linkable files. As used herein, "build file" refers to a file that comprises a set of tasks, commands, and/or instructions which, when executed, are operable to generate a build of a software program.

In step 104, while the first build file is being executed to generate the first build of the software program, steps 104A and 104B are performed. In step 104, the activity in the file system is continuously monitored to determine a plurality of files that are being accessed in the file system while the build of the software program is being generated. In step 104B, first information about the plurality of accessed files is recorded. The recorded first information is a set of metadata about the build, which is also referred to herein as "build information". The build information may include the values of various file and/or file system attributes including, without limitation, attributes that identify the plurality of accessed files, attributes indicating the creation and/or access timestamps associated with the plurality of access files, and attributes that indicate the relationships and dependencies among the plurality of accessed files.

After the first build of the software program is generated, in step 106 the recorded first information about the first build is sent to a configuration management server.

The configuration management server automatically analyzes the received first information and determines one or more dependencies among the plurality of files accessed while the first build of the software program was being generated. As used herein, "dependency" refers to an association that exists between two or more files. For example, a dependency may exist between a target file that is generated for the build of a software program and one or more source files that store the source code (or portions thereof) of the program. In another example, a dependency may exist between a source file and one or more other source and/or object files of the software program.

After determining the one or more dependencies among the plurality of accessed files, the configuration management server generates second information that indicates the one or more dependencies. The second information may be used to produce a second build file for generating a subsequent build of the software program. For example, in step 108 the second information is received from the configuration management server. Based at least on the second information, a second build file that reflects the one or more dependencies among the plurality of files is generated in step 110.

In step 112, the second build file is executed to generate a second build of the software program. Since the second build file reflects the one or more file dependencies determined based on information recorded while generating the previous build, the second build of the software program may be generated by using less computing resources than the computing resources used for the previous build. For example, if one or more source files have been compiled during the previous build and have not been changed since, the second build file would not include instructions for recompiling these one or more source files; instead, the second build file would only include instructions for using the compiled versions (e.g., object files) of these one or more source files while generating the second build of the software program.

In some embodiments, the techniques described herein provide for monitoring activity in the file system and recording build information while each build of the software program is being generated. The recorded build information is sent to the configuration management server. The configuration management server may analyze some or all of the build information recorded during each build of the software program in order to determine dependencies among the build files for any subsequent build.

For example, while the second build of the software program is being generated in step 112 of FIG. 1, activity in the file system may be continuously monitored to determine the plurality of files that are being accessed as part of that build. Build information about this plurality of files is recorded and sent to the configuration management server for analysis. The configuration management server may analyze the build information recorded while the first build and second build were being generated, and may generate dependency information that can be used to generate the build file for a subsequent build. In this manner, the build file for the subsequent build would reflect the dependencies of among the files participating in the build, and as a result the subsequent build of the software program would be generated more efficiently.

III. Build Information and Example Bill of Materials

According to the techniques described herein, build information is collected by monitoring activity in a file system while the build of a software program is being generated. Build information is also referred to herein as a "Bill of Materials" (BOM), and may be stored in what is referred to herein as a "BOM" file. In embodiments implemented in a mainframe computer system, files that are accessed and/or processed during a build are included in a "data set", which refers to a collection of files that are stored in one or more file systems operated by the mainframe computer system.

The techniques described herein are not limited to any particular type or kind of build information that may be collected about a build. Rather, the techniques described herein provide for collecting any type or kind of build metadata that may be used to optimize any subsequent builds.

For example, in some embodiments the collected build information includes the values of one or more file system attributes of the files that are accessed while a build is being generated. Examples of such attribute values include, but are not limited to, a file identifier of a file, a date and time (e.g., a timestamp) when a file was created, a date and time when a file was last accessed; a date and time when a file was last modified; a version of a file, a size of a file, a current checksum associated with a file, and a path indicating the location in the file system where a file is located.

In addition, in some embodiments the collected build information may also include parameter values which indicate particular relationships and associations among files that are accessed while a build is being generated. For example, suppose that while a particular build of a particular software program is being generated, as file "A" is being compiled files "B", "C", and "D" are being accessed (e.g., held open) by the particular operating system that operates the file system(s) in which files "A", "B", "C", and "D" reside. In this example, the collected build information may include timestamp values indicating when compilation of file "A" begun and ended, and the timestamp values indicating when each of files "B", "C", and "D" were opened and closed. An impact and dependency analysis performed on these timestamp values by a configuration management server would determine that file "A" depends on files "B", "C", and "D". Thus, the configuration management server may generate dependency information which categorizes file "A" as being dependent on files "B", "C", and "D", and which categorizes files "B", "C", and "D" as being related to file "A".

In some embodiments, the collected build information may be provided to a configuration management sever in an eXtensible Markup Language (XML) format. FIG. 2 is a block diagram that illustrates an example of build information formatted in XML according to one embodiment.

XML file 200 comprises multiple XML elements that store the build information collected while a particular build of a particular software program is being generated by a particular mainframe computer system. For example, XML file 200 includes XML element 202 ("StartTime") which stores the start date and time when the particular build is executed, and XML element 204 ("OperatingSystem") which stores the operating system in which the particular build is being generated.

XML file 200 includes XML elements 206 that store various parameter values associated with target items of the particular build. For example, XML element 206 "Name" stores a value indicating the name ("//MTROTH.TEST.BLD1.DEV.OBJ(MDOARBLD)") of an object file of the particular build, and XML element 206 "mtime" stores a timestamp value associated with that object file. XML element 208 ("Target") stores a value indicating the name ("//MTROTH.TEST.BLD1.DEV.LNKLIB(MDOARBLD)") of the linked/executable file of the particular build and a timestamp value associated with that linked/executable file.

XML file 200 includes XML element 210 ("Listing") that stores a value indicating the name ("//MTROTH.TEST.BLD1.DEV.ASMLST(MDOARBLD)") of a file listing a particular type code, a type value indicating the exact type of the code ("Assembly_Listing"), and a timestamp value associated with that file.

XML file 200 also includes multiple XML elements that store parameter values associated with source items of the particular build. For example, XML element 212 ("SourceItem") stores a value indicating the name ("//MTROTH.TEST.BLD1.DEV.ASM(MDOARBLD)") of a file that stores the source code of the particular build. XML element 212 also includes a child XML element that stores various metadata values associated with the source code file such as, for example, an item ID ("item-uid=4206370"), an item specification ID ("item-spec=4255494C443A4133352E412D535"), a file version ("file-version=1"), a checksum value ("checksum=ce4673c8fd1f3a633ffac2f85c3468a4"), a file size ("fetch-size=215760"), and a timestamp value ("mtime=1156465012").

Other examples of source item values stored in the XML elements of XML file 200 may indicate one or more files that store system libraries. For example, XML element 214 ("SourceItem") stores a value indicating the name ("//SYS1.MACLIB(SYSSTATE)") of a file that stores a system library that is accessed and used during the particular build.

Solely for the purposes of illustration, FIG. 2 provides an example of a BOM file that is formatted in XML. However, the techniques described herein are not so limited and files storing build information may be formatted according to any now known or later developed open source format, proprietary format, or data definition language. For this reason, the example of XML-formatted build information file provided in FIG. 2 is to be regarded in an illustrative rather than a restrictive sense.

IV. Example Operational Context

Figure 3:
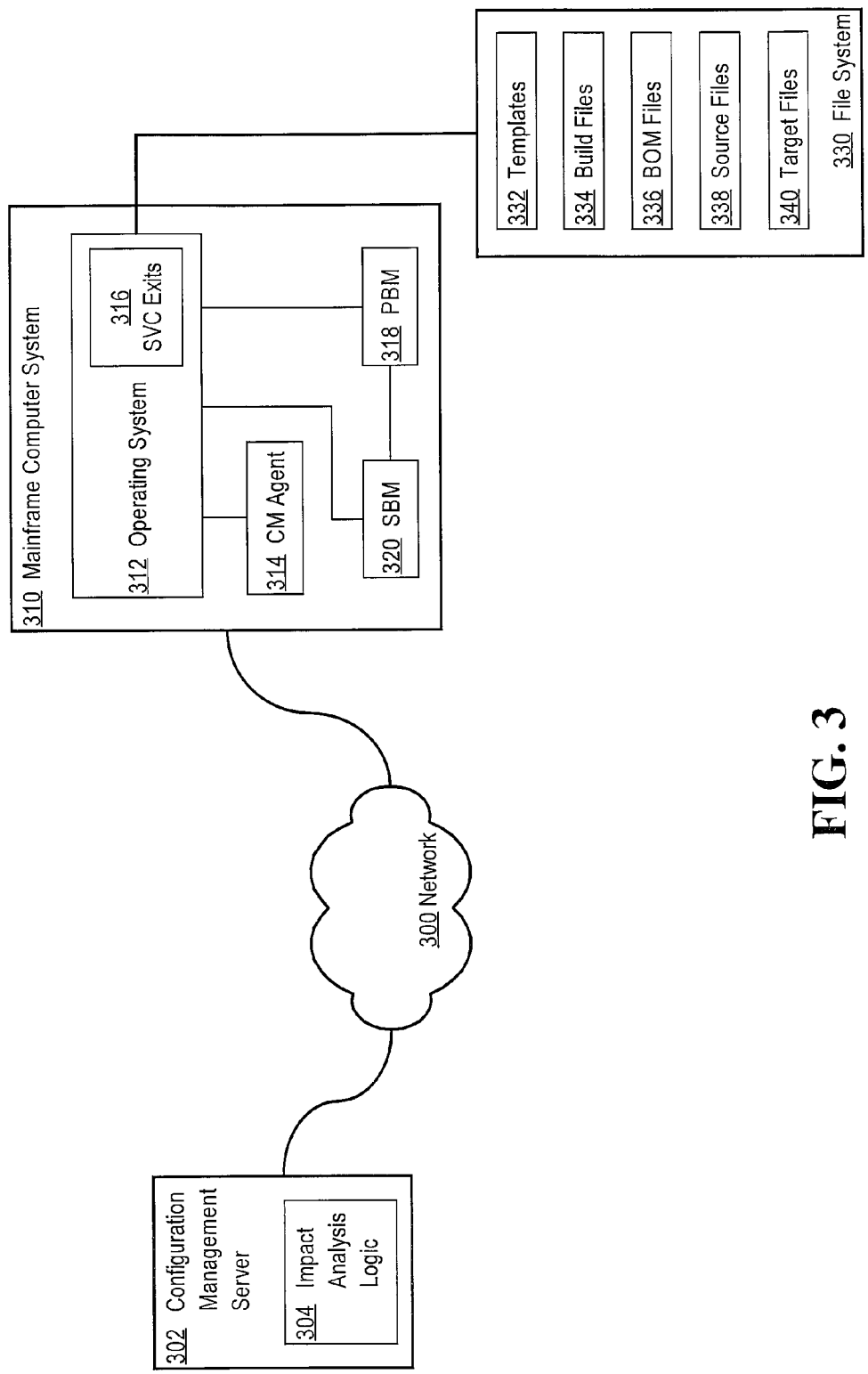
FIG. 3 is a block diagram that illustrates an example operational context in a mainframe development environment according to one embodiment.

FIG. 3 is a block diagram that illustrates an example operational context in a mainframe development environment according to one embodiment. The example operational context provides for configuration management server 302 that is communicatively connected to mainframe computer system 310 over network 300.

Configuration management server 302 is operable to control and manage software project development by supporting various development functionalities including, without limitation, versioning of project files, providing components for building executable project files, and controlling access to project files. In the operational context illustrated in FIG. 3, configuration management server 302 is operable to configure and manage generating builds of software programs and/or applications on mainframe computer system 310. In this operational context, configuration management server 302 may be executing on a physical node that is different than the physical node on which mainframe computer system 310 resides.

Configuration management server 302 comprises impact analysis logic 304. Impact analysis logic 304 is generally a set of instructions which, when executed by one or more processors, are operable to automatically analyze build information received from mainframe computer systems according to the techniques described herein. For example, impact analysis logic 304 may be operable to detect and determine relationships and dependencies among files participating in builds performed on mainframe computer system 310. According to the techniques described herein, impact analysis logic 304 is also operable to generate dependency information based on the analysis of the received build information. In various embodiments, impact analysis logic 304 may be implemented as any software component that can be executed at a computer system including, but not limited to, a library of functions, a plug-in module, and one or more standalone programs or applications.

Mainframe computer system 310 comprises operating system (OS) 312. According to the techniques described herein, operating system 312 may be any one of MVS, z/OS, and OS390 operating systems provided by IBM Corporation of Armonk, N.Y. Mainframe computer system 310 also comprises configuration management (CM) agent 314. CM agent 314 is operable to communicatively connect to, and exchange information with, configuration management server 302. CM agent 314 is a set of instructions that may be executed as a task, process, or daemon by operating system 312 on the same physical node on which mainframe computer 310 resides.

Operating system 312 is operatively connected to, and controls the operations in, one or more file systems such as file system 330. File system 330 stores files on a machine-readable medium. According to the techniques described herein, file system 330 may store at least template files 332, build files 334, BOM files 336, source files 338, and target files 340.

A template file is a customizable file that contains variables and other control keywords, where the variables may be substituted with parameter values included in an input file. For example, according to the techniques described herein, a build file may be generated by substituting the variables in a template file with values included in the dependency information received from a configuration management server such as configuration management server 302. A build file comprises a set of tasks, commands, and/or instructions which, when executed, are operable to generate a build of a software program; file system 330 may store one or more build files for software programs and/or applications that are developed on mainframe computer system 310. According to the techniques described herein, a BOM file is a file that stores build information collected by monitoring a file system while a build is being generated; file system 330 may store one or more BOM files for each of one or more builds of one or more software programs that are generated at mainframe computer system 310. A source file is a file that stores source code or object code for a software program such as, for example, a header file, a source code file, and an object code file; file system 330 may store one or more source files for each of one or more software programs or applications that are generated at mainframe computer system 310. A target file is a file included in a build of a software program such as, for example, an object file and an executable file; file system 330 may store one or more target files for each of one or more software programs or applications that are generated at mainframe computer system 310.

Operating system 312 also comprises one or more Supervisor Call (SVC) exits 316. In general, an SVC exit is a callback routine that allows a process to plug into, and monitor, operations that are performed at the operating system level. For example, in response to the occurrence of certain events in an operating system (e.g., execution of a particular instruction or call), the operating system may transfer execution to an SVC exit that is registered in the operating system to monitor the certain events.

According to the techniques described herein, SVC exits 316 are user-defined routines that are registered with operating system 312 to monitor specific instructions and/or calls that are executed in the operating system. SVC exits 316 are used to monitor the activity in a file system (such as file system 330) while a build of a software program is being executed by a process or processes under the control of operating system 312. In response to particular event of interest in file system 330 (e.g., a file being accessed, opened, closed, etc.), operating system 312 would invoke the user-defined SVC exit for that event. An event of interest may occur when a process that is generating the build of a software program executes an OS instruction or call to access or otherwise process a file in file system 330. When executed, the user-defined SVC exit would record information about the particular event (e.g., about the instruction or call that was executed against a particular file or files in file system 330) and would return the recorded information to the process that initiated the particular event (e.g., to the process that is generating the build of a software program).

In operation, suppose that configuration management server 302 is used to generate a build of a software program on mainframe computer system 310.

To initiate the generation of a build on mainframe computer system 310, configuration management server 302 generates a file that includes a Build Request Definition (BRD). The BRD is a set of metadata information that is used at mainframe computer system 310 to generate a build file. For example, the BRD may include dependency information that has been determined by impact analysis logic 304 based on build information collected at mainframe computer system 310 for a previous build. In one embodiment, the BRD file is formatted in XML. In other embodiments, the BRD file may be formatted in any other open-source or proprietary format that is understood by configuration management server 302 and CM agent 314.

Configuration management server 302 sends the BRD file to CM agent 314 on mainframe computer system 310. After receiving the BRD file, CM agent 314 starts (or causes the start of) primary build monitor (PBM) process 318 and passes to it the BRD file. A process, such as PBM process 318, executes on mainframe computer system 310 as a combination of a software component and an allocation of computational resources (e.g., memory, CPU time, and/or disk storage space) for executing the software component.

After receiving the BRD file from CM agent 314, PBM process 318 processes the BRD file to generate a build file. For example, PBM process 318 may retrieve parameter values from the BRD file and, based on the parameter values, may determine the software program for which a build is to be generated as well as one or more template files 332 that may be used to generate a build file for that software program. PBM process 318 then generates a build file 334 for the software program by substituting the variables in the one or more template files 332 with parameter values retrieved from the BRD file. PBM process 318 may store the generated build file 334 in file system 330.

In some embodiments, separate template files may be provided to build intermediate and final target files for a specified build. In these embodiments, the separate template files specify commands for executing general commands via remote job execution, controlling deployments, and/or for constructing the body of e-mail messages used for notifications. In some embodiments, a configuration management server may provide one or more template files in a default "TEMPLATE" data set that includes at least one of a template used to invoke the assembler compiler of the mainframe computer system and a template used to invoke the linker compiler of the system. In some embodiments, transition rule templates and application rule templates may also be provided. A transition rule template is a set of rules that defines how a file type transitions to the next build state. For example, a transition template rule may state that the file type "*.c" is transitioned to the file type "*.obj" when a GNU C compiler is used. An application rule template defines a group of transition rules that are used to create a software program or application. In general, templates are used to save time, to reduce repetition, and to provide consistency between builds.

Referring to the operational context of FIG. 3, the build file 334 generated by PBM process 318 may specify the files participating in the build of the software program, the order in which these files need to be accessed, compiled, and/or linked, and any other commands and instructions that may be needed to generate the build. The build tasks specified in build file 334 may be defined as one or more commands and/or operations in a scripting language. The scripting language may be any scripting language that is understood by configuration management server 302, CM agent 314, and/or mainframe computer system 310. In addition, configuration management server 302 may use the same scripting language to communicate with other CM agents that may be executing as clients in client-server software development environments as well as other mainframe development environments.

After generating the build file, PBM process 318 starts (or causes the start of) secondary build monitor (SBM) process 320. SBM process 320 is operable to generate the build of the software program by executing the build file and performing the tasks, commands, and/or instructions specified therein.

During the execution of the build file, by using SVC exits 316, SBM process 320 monitors the one or more source files 338 and the one or more target files 340 that are accessed or otherwise processed in file system 330. For example, as operating system 312 invokes instructions or calls to access or otherwise process (e.g., create, store, etc.) a file in file system 330, operating system 312 invokes one or more of SVC exits 316. When invoked, an SVC exit would record information about the instruction or call that was executed as well as information about the file against which the instruction or call was executed, and would return the recorded information to SBM process 320. SBM process 320 processes, formats, and records this information in association with the build that the process is currently generating.

In some embodiments, a build file may also include directives for the build process executing the build file, which directives may be related to particular build tasks defined in a BRD file. A directive is one or more instructions to the build process, which one or more instructions direct the process to turn on a particular SVC exit and to watch for a specific "DD" mainframe operating system operation. (A "DD" operation is a named file access operation that specifies a particular data set in the mainframe file system.) In effect, the directive instructs the build process to watch for particular file access operations that are performed over the files of a particular data set in the mainframe file system. In this manner, when a build is being generated, the build process can dynamically determine the exact type of build information that needs to be collected. This in turn allows for the proper categorization of the collected build information, for example, by categorizing whether a particular file is related to or depends on one or more other files. It is noted that in these embodiments, directives set forth in a build file may be used to cause a build process to dynamically turn on SVC exits for any operation that is performed by a build task including, but not limited to, build task inputs and build task outputs.

In addition to directives for dynamically turning on (and/or off) SVC exits, in some embodiments the list of commands included in a build file may include communication commands that direct a build process to capture the status information indicating the progress of the build. In response to those commands, the build process executing the build file would capture the necessary status information and would relay it back to the configuration management server, which would then be able to display the status information to a user that started the build. In these embodiments, the build status information may be relayed back from the mainframe computer system to the configuration management server by using any communication mechanism such as, for example, a SOAP message.

Referring to the operational context of FIG. 3, when SBM process 320 completes the generation of the build of the software program, SBM process 320 stores the collected build information in a BOM file 336 in file system 330. After generating and storing the build information in BOM file 336, SBM process 320 passes BOM file 336 to PBM process 318, which in turn passes it to CM agent 314. CM agent 314 reformats BOM file 336 into an XML format and sends this XML BOM file to configuration management server 302.

Configuration management server 302 may analyze the build information stored in the XML BOM file and may determine the relationships and dependencies between source files and target files accessed and/or otherwise processed while the build was being generated at mainframe computer system 310. Based on detected dependencies and relationships, configuration management server 302 may automatically generate dependency information that can be used for performing a subsequent build of the same software program. For example, when a subsequent build needs to be generated, configuration management server 302 may include the dependency information into a BRD file that is used to initiate the generation of the subsequent build at mainframe computer system 310. While the subsequent build is being generated, an SBM process may perform any necessary comparisons between the build information collected for the previous build and current information associated with currently accessed files to determine whether these files have changed since the last build. If these files have not changed, the SBM process may skip any build tasks that involve these files. In this manner, the generation of the subsequent build may be executed faster and/or otherwise more efficiently.

It is noted that use of PBM and SBM build processes is described with respect to the operational context of FIG. 3 for illustrative purposes only. In other operational contexts and embodiments, the build tasks, commands, and operations specified in a build file may be performed by a single build process or by any number of build processes. For this reason, the use of PBM and SBM build processes described herein is to be regarded in an illustrative rather than a restrictive sense.

V. Dependency Determination and Impact Analysis

In one embodiment, a configuration management server may use the build information received in a BOM file to determine the major dependencies between the files participating in a particular build. An example of such major dependency is the dependency between header files and source code files. From an impact analysis standpoint, a major dependency of this type may be used to determine the effect that a particular change to a particular header file would have on a build.

In this embodiment, automatically performing impact analysis and dependency determination may be carried out according to the following example. When a build of a software program is performed at a mainframe computer system for the first time, the process generating the build monitors the file system as the compiler is compiling the header files and source code files, and records information regarding the files accessed by the compiler. After the build is generated, the collected build information is included in a BOM file that is passed to the configuration management server for analysis. When the next (or any subsequent) build for the same software program is requested or otherwise initiated by a user, the configuration management server may analyze the build information received in the BOM file (or files) to determine the relationships and dependencies among the files that previously participated in the build.

For example, the build information may indicate that as source code file "A" is being compiled header files "B", "C", and "D" are held open by the compiler; thus, the configuration management server would determine that source code file "A" depends on header files "B", "C", and "D". Based on this analysis, the configuration management server may include, in a BRD file that is sent to the mainframe computer system, information that would allow a build process to perform comparisons and to determine whether particular build tasks may be skipped. For example, based on the analysis information provided by the configuration management server, while generating the subsequent build the build process (e.g., a SBM process) may determine that files "A", "B", "C", and "D" have not changed since the previous build and, therefore, the build task involving the compilation of file "A" may be completely skipped.

In a similar manner, the configuration management server may perform impact analysis and may determine the dependency information for multiple (or even all) files involved in a build and may provide a build process at a mainframe computer system with appropriate information in a BRD file. For example, the configuration management server may determine all files that need to be recompiled if header file "B" has changed and may provide this information to the build process at the mainframe computer system.

In one embodiment, the configuration management server may use the build information received in a BOM file to perform extensive impact analysis for the purpose of predicting the impact a particular change would have on a particular build. In this embodiment, based on the build information of the particular build, the configuration management server may determine and store all dependencies between all files involved in the build. This embodiment may also provide a User Interface (UI) that lists all files in the build. When a developer selects a particular file in the UI, based on the dependencies for this file, the configuration management server may determine, and may display for the developer, a dependency tree of all other files that would be affected (e.g., the files that would have to be re-compiled, re-linked, etc.) in response to a change in the particular selected file.

VI. Additional Features and Alternative Embodiments

As an additional feature, one embodiment may provide for storing build information in a local BOM file that resides on the mainframe file system. When a subsequent build is generated, and before actually performing a particular build task, a build process (e.g., a SBM process) may inspect the files that would be affected by the particular build task and, based on the local copy of the BOM file and the current state of the items, may determine whether or not to perform that build task. For example, the build process may compare the timestamps of source and target files that are specified in the local BOM file to the current timestamps of source and target files as of the time of the current build. If the comparison indicates that the source and target files of the build task have not changed since the previous build, the build process may skip this build task and may proceed with the next build task of the build.

In some embodiments, a build engine executing on a mainframe computer system may be configured to receive build scripts from any entity that can provide such scripts. For example, one or more components may be provided for interfacing with the mainframe computer system though a Command-Line Interface (CLI) or though a web-based client. In response to receiving a build script from a particular entity, in these embodiments the build engine would start a build process on the mainframe computer system to execute the build script. During the execution of the build script, the build process would monitor the file system and would collect the necessary build information and, when the build is completed, would store the collected build information in a BOM file. Before exiting, the build process would send the BOM file to the build engine. Thereafter, the build engine may send the BOM file to the particular entity that requested the build.

In some embodiments, a build engine may execute one or more programs on the mainframe computer system in order to perform impact analysis and dependency determination locally at the mainframe computer system. Thus, in these embodiments the functionality of impact analysis and dependency determination may be partially or entirely performed at the mainframe computer system instead of at a configuration management server. The techniques described herein for impact analysis and dependency determination are not limited to being performed only a configuration management server, and for this reason the example embodiments described herein that utilize a configuration management server are to be regarded in an illustrative rather than a restrictive sense.

VII. Implementation Mechanisms

Figure 4:
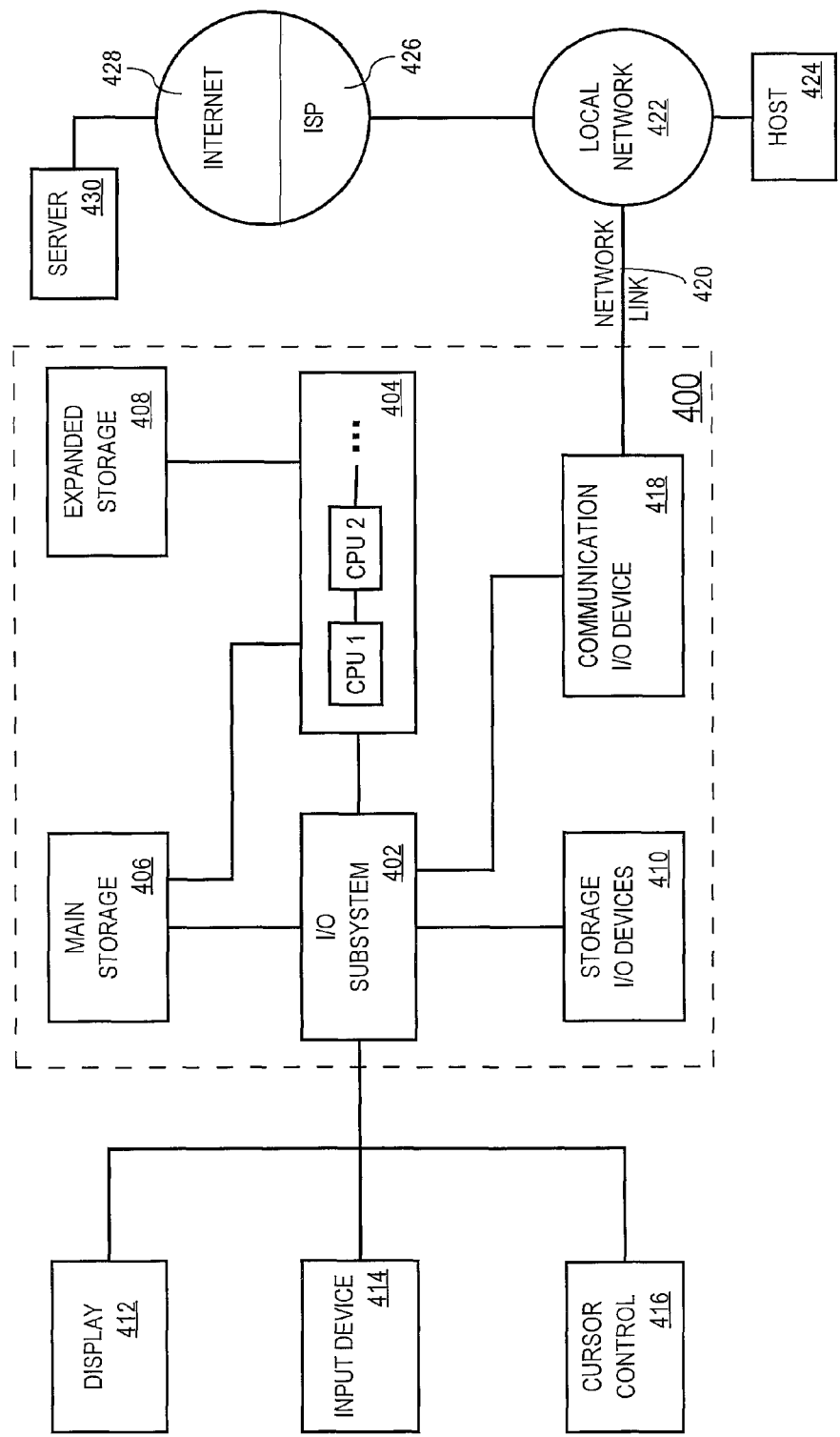
FIG. 4 is a block diagram of an example mainframe platform upon which embodiments may be implemented.

Embodiments of the techniques described herein may be implemented in a mainframe computer system that comprises one of MVS, z/OS, or OS390 operating systems and the example mainframe platform 400 illustrated in the block diagram of FIG. 4.

Mainframe platform 400 includes Input/Output (I/O) subsystem 402 or other mechanism for supporting I/O operations, and one or more processors 404 coupled with I/O subsystem 402 for processing information. Mainframe platform 400 also includes a main storage 406, such as a random access memory (RAM) or other dynamic storage device, coupled to I/O subsystem 402 and processors 404 for storing information and instructions to be executed by processors 404. Main storage 406 also may be used for storing temporary variables or other intermediate information during execution of instructions by processors 404. Mainframe platform 400 further includes expanded storage 408 that is coupled to processors 404. Expanded storage 408 may be a RAM or other dynamic storage device storing blocks of data transferred to or from main storage 408 and information and instructions for processors 404. One or more storage I/O devices 410, such as magnetic disks or optical disks, are provided and coupled to I/O subsystem 402 for storing information and instructions. I/O subsystem 402 controls the transfer of data, information, and instructions between main storage 406 and the storage I/O devices 410. I/O subsystem 402 communicates with the I/O devices provided in mainframe platform 400, and permits data processing at processors 404 to proceed concurrently with I/O processing.

Mainframe platform 400 may be coupled via I/O subsystem 402 to a display 412, such as a cathode ray tube (CRT) or a liquid crystal display (LCD), for displaying information to a computer user. An input device 414, including alphanumeric and other keys, is coupled to I/O subsystem 402 for communicating information and command selections to processors 404. Another type of user input device is cursor control 416, such as a mouse, a trackball, or cursor direction keys for communicating direction information and command selections to processors 404 and for controlling cursor movement on display 412. This input device typically has two degrees of freedom in two axes, a first axis (e.g., x) and a second axis (e.g., y), that allows the device to specify positions in a plane.

The invention is related to the use of mainframe platform 400 for implementing the techniques described herein. According to one embodiment, these techniques are performed by mainframe platform 400 in response to processors 404 executing one or more sequences of one or more instructions contained in main storage 406 and/or expanded storage 408. Such instructions may be read into main storage 406 from another machine-readable medium, such as storage I/O devices 410. Execution of the sequences of instructions contained in main storage 406 causes processors 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using mainframe platform 400, various machine-readable media are involved, for example, in providing instructions to processors 404 for execution. Such a medium may take many forms, including but not limited to, non-volatile media, volatile media, and transmission media. Non-volatile media includes, for example, optical or magnetic disks, such as storage I/O devices 410. Volatile media includes dynamic memory, such as main storage 406 and expanded storage 408. Transmission media includes coaxial cables, copper wire and fiber optics, including the wires that comprise I/O subsystem 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processors 404 for execution. For example, the instructions may initially be carried on a magnetic disk of a remote computer. The remote computer may load the instructions into its dynamic memory and may send data with the instructions to mainframe platform 400 over a transmission medium. Mainframe platform 400 may receive the instructions data at a communication I/O device, which may convert the instructions data if necessary and may place the instructions data in the appropriate circuitry and/or in a channel supported by I/O subsystem 402. I/O subsystem 402 carries the instructions data to main storage 406, from which processors 404 retrieve and execute the instructions. The instructions data received in main storage 406 may optionally be stored on one of storage I/O devices 410 either before or after execution by processors 404.

Mainframe platform 400 also includes a communication I/O device 418 coupled to I/O subsystem 402. Communication I/O device 418 provides a two-way data communication coupling to a network link 420 that is connected to a local network 422. For example, communication I/O device 418 may be an integrated services digital network (ISDN) card or a modem to provide a data communication connection to a corresponding type of telephone line. As another example, communication I/O device 418 may be a local area network (LAN) card to provide a data communication connection to a compatible LAN. Wireless links may also be implemented. In any such implementation, communication I/O device 418 sends and receives electrical, electromagnetic or optical signals that carry digital data streams representing various types of information.

Network link 420 typically provides data communication through one or more networks to other computer systems. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication I/O device 418, which carry the digital data to and from mainframe platform 400, are exemplary forms of carrier waves transporting the information.

Mainframe platform 400 can send messages and receive data, including program code, through the network(s), network link 420 and communication I/O device 418. In the Internet example, a server 430 might transmit code for a particular task or for an application program through Internet 428, ISP 426, local network 422 and communication I/O device 418. The transmitted code may be executed by processors 404 as it is received, and/or stored in storage I/O devices 410, or other non-volatile storage for later execution. In this manner, mainframe platform 400 may obtain the code of a particular task or of an application program in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method performed in a mainframe computer system that comprises a mainframe operating system that is one of a Multiple Virtual Storage (MVS) operating system, a z/OS operating system, or an OS390 operating system, the method comprising:
registering one or more supervisor call exit routines with the mainframe operating system;
executing a first build file to generate a first build of a software program from a set of files that are stored in a file system;
while executing the first build file to generate the first build of the software program, using the one or more supervisor call exit routines to:
monitor activity in the file system to determine a plurality of files, from the set of files, that are being accessed in the file system, and
record first information about the plurality of files that are being accessed in the file system;
wherein monitoring the activity in the file system comprises receiving, from the mainframe operating system, an invocation of at least one of the one or more supervisor call exit routines when a file of the plurality of files is accessed in the file system;
based at least on second information that indicates one or more dependencies among the plurality of files, generating a second build file that reflects the one or more dependencies among the plurality of files;

wherein the second information is based on the first information;

executing the second build file to generate a second build of the software program.

2. The computer-implemented method as recited in claim 1, wherein the second build of the software program is generated by using less computing resources than the first build of the software program.

3. The computer-implemented method as recited in claim 1, further comprising:
receiving the second information from a configuration management server; and
executing the second build file to generate the second build of the software program further comprises:
a first build process starting a second build process; and
the second build process executing the second build file.

4. The computer-implemented method as recited in claim 3, wherein generating the second build file based at least on the second information further comprises:
the second build process accessing a template file, wherein the template file is associated with the software program; and
the second build process generating the second build file by substituting one or more variables defined in the template file with one or more values included in the second information.

5. The computer-implemented method as recited in claim 1, further comprising:
while executing the second build file to generate the second build of the software program, performing the steps of:
monitoring the activity in the file system to determine a second plurality of files, from the set of files, that are being accessed in the file system; and
recording third information about the second plurality of files that are being accessed in the file system;
sending the third information to a configuration management server;
receiving fourth information from the configuration management server, wherein the fourth information indicates second one or more dependencies that are determined among the second plurality of files by the configuration management server based at least on the third information;
based at least on the fourth information, generating a third build file that reflects the second one or more dependencies among the second plurality of files; and
executing the third build file to generate a third build of the software program.

6. The computer-implemented method as recited in claim 5, wherein the fourth information is generated by the configuration management server based on the first information and the third information.

7. The computer-implemented method as recited in claim 1, wherein the first information is a set of metadata that includes one or more values for one or more file system attributes of each particular file in the plurality of files.

8. The computer-implemented method as recited in claim 7, wherein the one or more file system attributes of said each particular file include at least one of:
a file identifier of said each particular file;
a date and time when said each particular file was created;
a date and time when said each particular file was last accessed;
a date and time when said each particular file was last modified;
a version of said each particular file;
a size of said each particular file;
a current checksum associated with said each particular file; or
a path indicating the location in the file system where said each particular file is located.

9. The computer-implemented method as recited in claim 1, wherein the first information is a set of metadata that includes one or more values indicating at least one of:
an order in which the plurality of files are accessed in the file system;
a target file representing the first build of the software program; and
one or more source files from which the first build of the software program is generated.

10. The computer-implemented method as recited in claim 1, wherein at least one of the first information and the second information is formatted as an eXtensible Markup Language (XML) document.

11. A non-transitory machine-readable medium storing one or more stored instructions which, when processed by one or more processors of a mainframe computer system that comprises a mainframe operating system that is one of a Multiple Virtual Storage (MVS) operating system, a z/OS operating system, or an OS390 operating system, cause:
registering one or more supervisor call exit routines with the mainframe operating system;
executing a first build file to generate a first build of a software program from a set of files that are stored in a file system;
while executing the first build file to generate the first build of the software program, using the one or more supervisor call exit routines to:
monitor activity in the file system to determine a plurality of files, from the set of files, that are being accessed in the file system, and
record first information about the plurality of files that are being accessed in the file system;
wherein monitoring the activity in the file system comprises receiving, from the mainframe operating system, an invocation of at least one of the one or more supervisor call exit routines when a file of the plurality of files is accessed in the file system;
based at least on second information that indicates one or more dependencies among the plurality of files, generating a second build file that reflects the one or more dependencies among the plurality of files;
wherein the second information is based on the first information;
executing the second build file to generate a second build of the software program.

12. The non-transitory machine-readable medium as recited in claim 11, wherein the second build of the software program is generated by using less computing resources than the first build of the software program.

13. The non-transitory machine-readable medium as recited in claim 11, wherein the one or more stored instructions further comprising instructions which, when processed by the one or more processors, cause:
receiving the second information from a configuration management server; and
wherein the instructions that cause executing the second build file to generate the second build of the software program further comprise instructions which, when processed by the one or more processors, cause:
a first build process starting a second build process; and
the second build process executing the second build file.

14. The non-transitory machine-readable medium as recited in claim 13, wherein the instructions that cause generating the second build file based at least on the second information further comprise instructions which, when processed by the one or more processors, cause:

the second build process accessing a template file, wherein the template file is associated with the software program; and the second build process generating the second build file by substituting one or more variables defined in the template file with one or more values included in the second information.

15. The non-transitory machine-readable medium as recited in claim 11, wherein the one or more stored instructions further comprise instructions which, when processed by the one or more processors, cause:

while executing the second build file to generate the second build of the software program, performing the steps of:
monitoring the activity in the file system to determine a second plurality of files, from the set of files, that are being accessed in the file system; and
recording third information about the second plurality of files that are being accessed in the file system;

sending the third information to a configuration management server;

receiving fourth information from the configuration management server, wherein the fourth information indicates second one or more dependencies that are determined among the second plurality of files by the configuration management server based at least on the third information;

based at least on the fourth information, generating a third build file that reflects the second one or more dependencies among the second plurality of files; and executing the third build file to generate a third build of the software program.

16. The non-transitory machine-readable medium as recited in claim 15, wherein the fourth information is generated by the configuration management server based on the first information and the third information.

17. The non-transitory machine-readable medium as recited in claim 11, wherein the first information is a set of metadata that includes one or more values for one or more file system attributes of each particular file in the plurality of files.

18. The non-transitory machine-readable medium as recited in claim 17, wherein the one or more file system attributes of said each particular file include at least one of:
a file identifier of said each particular file;
a date and time when said each particular file was created;
a date and time when said each particular file was last accessed;
a date and time when said each particular file was last modified;
a version of said each particular file;
a size of said each particular file;
a current checksum associated with said each particular file; or
a path indicating the location in the file system where said each particular file is located.

19. The non-transitory machine-readable medium as recited in claim 11, wherein the first information is a set of metadata that includes one or more values indicating at least one of:
an order in which the plurality of files are accessed in the file system;
a target file representing the first build of the software program; and
one or more source files from which the first build of the software program is generated.

20. The non-transitory machine-readable medium as recited in claim 11, wherein at least one of the first information and the second information is formatted as an eXtensible Markup Language (XML) document.

21. A mainframe computer system comprising:
one or more processors;
a mainframe operating system that is one of a Multiple Virtual Storage (MVS) operating system, a z/OS operating system, or an OS390 operating system;
a file system; and
logic which, when executed by the one or more processors, is operable to:
register one or more supervisor call exit routines with the mainframe operating system;
execute a first build file to generate a first build of a software program from a set of files that are stored in the file system;
while executing the first build file to generate the first build of the software program, use the one or more supervisor call exit routines to:
monitor activity in the file system to determine the plurality of files, from the set of files, that are being accessed in the file system;
receive, from the mainframe operating system, an invocation of at least one of the one or more supervisor call exit routines when a file of the plurality of files is accessed in the file system; and
record first information about the plurality of files that are being accessed in the file system;
based at least on second information that indicates one or more dependencies among the plurality of files, generate a second build file that reflects the one or more dependencies among the plurality of files;
wherein the second information is based on the first information;
execute the second build file to generate a second build of the software program.

22. The mainframe computer system as recited in claim 21, wherein the logic, when executed by the one or more processors, is further operable to receive the second information from a configuration management server; and wherein the logic operable to execute the second build file to generate the second build of the software program is further operable, when executed by the one or more processors, to cause a first build process to start a second build process, and to cause the second build process to execute the second build file.

23. The mainframe computer system as recited in claim 22, wherein the logic operable to generate the second build file based at least on the second information is further operable, when executed by the one or more processors, to:
cause the second build process to access a template file, wherein the template file is associated with the software program; and
cause the second build process to generate the second build file by substituting one or more variables defined in the template file with one or more values included in the second information.

24. The mainframe computer system as recited in claim 21, wherein the logic, when executed by the one or more processors, is further operable to:
while executing the second build file to generate the second build of the software program:
monitor the activity in the file system to determine a second plurality of files, from the set of files, that are being accessed in the file system, and
record third information about the second plurality of files that are being accessed in the file system;

send the third information to a configuration management server;

receive fourth information from the configuration management server, wherein the fourth information indicates second one or more dependencies that are determined among the second plurality of files by the configuration management server based at least on the third information;

based at least on the fourth information, generate a third build file that reflects the second one or more dependencies among the second plurality of files; and execute the third build file to generate a third build of the software program.

25. The mainframe computer system as recited in claim 24, wherein the fourth information is generated by the configuration management server based on the first information and the third information.

* * * * *